E. & W. BALL.
Dropping Platform for Harvesters.
No. 80,112.                                            Patented July 21, 1868.
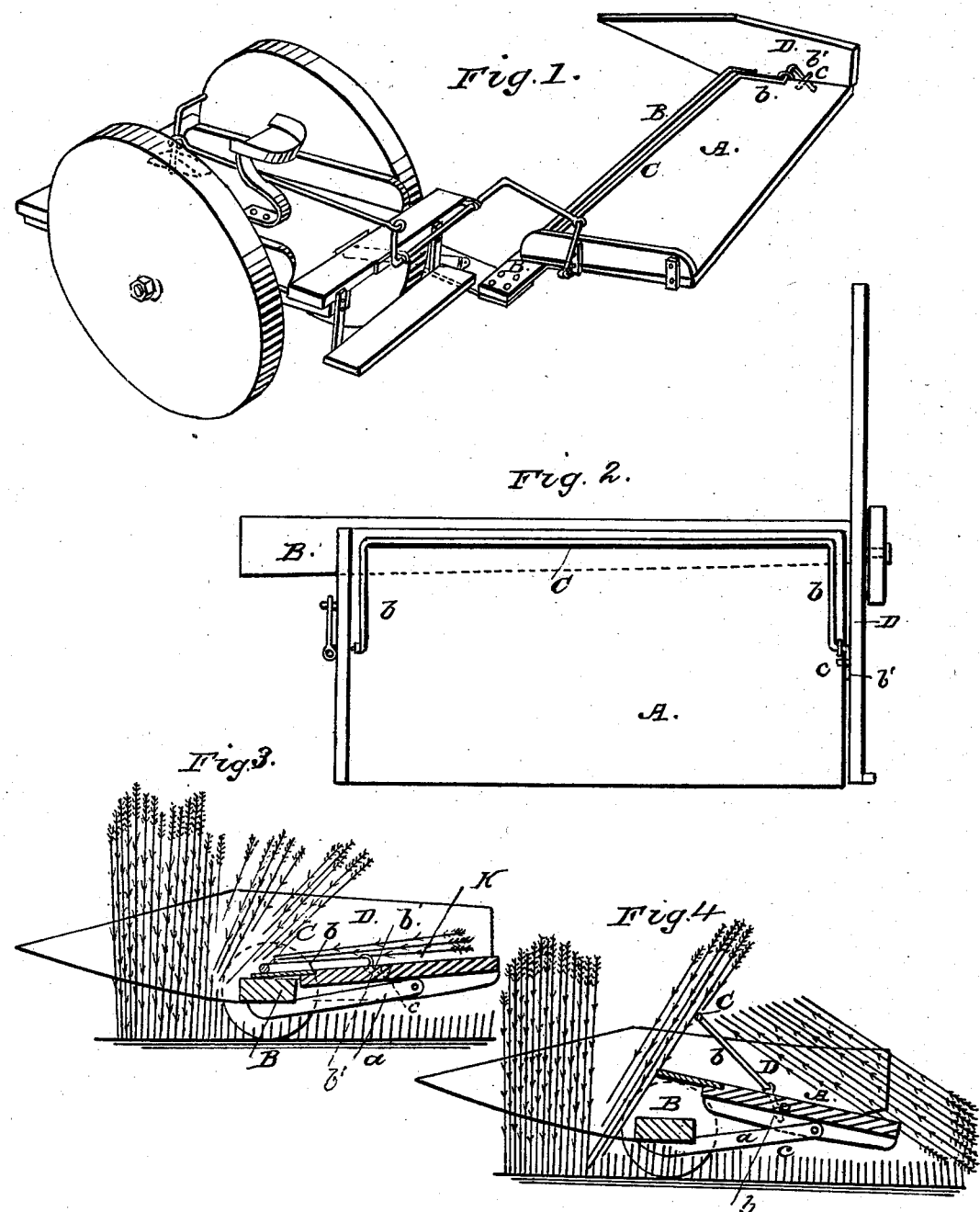

United States Patent Office.

EPHRAIM BALL AND MILTON BALL, OF CANTON, OHIO, ASSIGNORS TO JOHN F. SEIBERLING.

*Letters Patent No. 80,112, dated July 21, 1868.*

IMPROVEMENT IN DROPPING-PLATFORMS FOR HARVESTERS.

*The Schedule referred to in these Letters Patent and making part of the same.*

TO ALL WHOM IT MAY CONCERN:

Be it known that we, EPHRAIM BALL and MILTON BALL, of Canton, Stark county, State of Ohio, have invented a new and useful Improvement in Harvesting-Machines; and we do hereby declare that the following is a full, clear, and exact description thereof, reference being had to the accompanying drawings, making a part of this specification, in which—

Figure 1 is a perspective view of a harvesting-machine having our invention applied to it.

Figure 2 is a plan view of the platform of fig. 1.

Figures 3 and 4 are vertical sections of the platform, showing it in two positions.

Similar letters of reference indicate corresponding parts in the several figures.

The object of our invention is to combine a hinged bail with a hinged platform of a reaping-machine in such manner that by dropping the rear part of the platform very slightly, said bail will be elevated sufficiently high above its forward part to effect the discharge of the gavel, and that when the rear end of the platform is in a position for receiving the falling grain, the bail will be closely upon the finger-beam, or the forward part of the platform, as will be hereinafter described.

To enable others skilled in the art to make and use our invention, we will describe its construction and operation.

In the accompanying drawings, we have represented our invention applied to a platform, A, which is hinged at points in rear of its forward edge to arms *a a*, which are secured to and project in rear of the finger-beam B. When thus applied, the platform can be tilted backward when it is desired to drop the gavel upon the ground, by elevating its forward end, as shown in fig. 4; and should the pivotal connection of the platform be in rear of a line drawn through the middle of its width, the forward part will preponderate over the rear part, and consequently, when the power which was applied to elevate said forward part is removed, the platform will fall back to the position shown in figs. 1, 2, and 3, for receiving the cut grain.

If desirable, the platform may be pivoted, at its forward edge, to the finger-beam, so that its rear part of the platform only will rise and fall in the operation of gathering the cut grain and dropping the gavel upon the ground.

C represents a rod, which extends along the front part of the platform A, and parallel to the edge thereof, as shown in figs. 1 and 2, and which has two arms, *b b*, projecting at right angles from its extremities, that are pivoted in such manner to the platform as to allow the rod C to be thrown up to the position represented in fig. 4. This movement is imparted to the rod C, when the forward part of the platform is elevated, by means of a fixed pin, *c*, which projects from the divider or guard D, and depresses an extension, *b'*, of one of the arms *b*, as represented in the drawings.

In fig. 1 we have represented a system of levers, communicating with the forward portion of the platform A, and arranged in such manner that the attendant, whilst riding upon the machine, can, at pleasure, tilt the platform backward, and, simultaneously therewith, elevate the rod C, and thus discharge the load upon the ground, after which he can allow the parts to return to their former position.

The rod C, with its arms *b b*, constitutes a kind of bail, which serves as a means for elevating the butts or cut ends of the grain-straws lying upon the platform, above the surface of the platform, sufficiently high to cause the grain to slide therefrom and fall upon the ground in gavels.

This bail also serves as a means for preventing grain from falling upon the platform during the discharge of the gavel therefrom, thus enabling us to make the gavels of a uniform size without stopping the machine to effect the discharge.

The bail C should be so arranged with reference to the cutting-apparatus as to allow the cut grain, which falls upon it during the discharge of a gavel, to fall upon the platform after such discharge, or when the bail is allowed to fall down upon the platform and assume the position represented in fig. 3.

When our invention is applied to a hinged platform, as described, the latter will assist in discharging the grain, as the rear ends or heads of the grain will, in this case, be depressed simultaneously with the raising of the butts, and consequently the inclination which is necessary to discharge the grain can be obtained by a shorter movement of the rod C than could be obtained by having a fixed platform, or one which is pivoted at its forward edge. For this reason we prefer to hinge the platform at an intermediate point between its forward and back edges, as above described. Still, it may be found desirable in some cases to apply our hinged bail to a fixed platform, and to effect the discharge of the grain by means of the bail alone.

By pivoting the bail C to the platform A, forward of the hinged connection or axis of motion of this platform, it will be seen that the bail is elevated bodily when the platform is tilted backward, and when the platform is released and allowed to fall back to its former position, the weight of said bail will cause the platform to fall with more certainty.

What we claim as new, and desire to secure by Letters Patent, is—

Combining a bail or rod with a tilting-platform of a reaping-machine, in such manner that when the front edge of the platform is elevated above the plane of the finger-beam, said bail will simultaneously become elevated above the finger-beam and platform, for the double purpose of arresting the falling grain and facilitating the discharge of the gavel, substantially as described.

Witness our hands, this 14th day of January, 1865.

EPHRAIM BALL,
M. BALL.

Witnesses:
M. L. FOST,
GEO. W. RAFF.